(12) United States Patent
Yarabolu (10) Patent No.: US 11,727,306 B2
(45) Date of Patent: *Aug. 15, 2023

(54) DISTRIBUTED ARTIFICIAL INTELLIGENCE MODEL WITH DECEPTION NODES

(71) Applicant: BANK OF AMERICA CORPORATION, Charlotte, NC (US)

(72) Inventor: Vijay Kumar Yarabolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 389 days.

This patent is subject to a terminal disclaimer.

(21) Appl. No.: 16/879,326

(22) Filed: May 20, 2020

(65) Prior Publication Data

US 2021/0365830 A1   Nov. 25, 2021

(51) Int. Cl.
*G06N 20/00* (2019.01)
*G06F 21/31* (2013.01)
*G06N 5/04* (2023.01)

(52) U.S. Cl.
CPC ............. *G06N 20/00* (2019.01); *G06F 21/31* (2013.01); *G06N 5/04* (2013.01)

(58) Field of Classification Search
CPC ........... G06F 21/31; G06N 20/00; G06N 5/04
USPC .......................................................... 726/10
See application file for complete search history.

(56) References Cited

U.S. PATENT DOCUMENTS

| | | |
|---|---|---|
| 6,459,683 B2 | 10/2002 | Busuioc et al. |
| 6,722,190 B2 | 8/2004 | Hodjat et al. |
| 7,047,861 B2 | 5/2006 | Solomon |
| 7,206,805 B1 | 4/2007 | McLaughlin, Jr. |
| 7,290,056 B1 | 10/2007 | McLaughlin, Jr. |
| 7,340,648 B2 | 3/2008 | Asauchi |
| 7,343,222 B2 | 3/2008 | Solomon |
| 7,552,393 B2 | 6/2009 | Hayes-Roth |
| 7,672,841 B2 | 3/2010 | Bennett |
| 7,698,239 B2 | 4/2010 | Lieuallen et al. |
| 7,801,591 B1 | 9/2010 | Shusterman |
| 7,966,659 B1 | 6/2011 | Wilkinson et al. |
| 7,970,721 B2 | 6/2011 | Leskovec et al. |
| 8,108,623 B2 | 1/2012 | Krishnaprasad et al. |
| 8,161,244 B2 | 4/2012 | Krishnaprasad et al. |
| 8,176,256 B2 | 5/2012 | Krishnaprasad et al. |
| 8,260,733 B2 | 9/2012 | Sullivan et al. |

(Continued)

OTHER PUBLICATIONS

U.S. Appl. No. 16/879,193, filed May 20, 2020, Yarabolu.

*Primary Examiner* — Saleh Najjar
*Assistant Examiner* — Peiliang Pan (57) ABSTRACT

A model designer improves the security of a machine learning model in certain embodiments. Instead of storing the model in a central location, the training data used to build and train the model is stored across several different databases and/or datacenters. The training data is divided into portions and stored as a circular linked list across these databases and/or datacenters. The model designer retrieves the training data and incrementally builds and trains the model using the training data. The incremental error and bias of the model is used to locate training data between datacenters. Additionally, fake training data is appended to the circular linked list and the model designer tracks how much training data is used before hitting fake training data.

17 Claims, 4 Drawing Sheets

(56) References Cited

U.S. PATENT DOCUMENTS

| | | | |
|---|---|---|---|
| 8,429,307 B1* | 4/2013 | Faibish | G06F 3/0689 710/33 |
| 8,463,025 B2 | 6/2013 | Melvin et al. | |
| 8,478,677 B2 | 7/2013 | Solomon | |
| 8,484,417 B2 | 7/2013 | Xun et al. | |
| 8,769,055 B2 | 7/2014 | Murphy et al. | |
| 8,812,279 B2 | 8/2014 | Perrett | |
| 8,892,766 B1* | 11/2014 | Wei | H04L 63/20 706/26 |
| 9,021,269 B2* | 4/2015 | Spilman | H04L 9/3239 713/168 |
| 9,045,993 B2 | 6/2015 | Alessi et al. | |
| 9,183,351 B2 | 11/2015 | Shusterman | |
| 9,509,524 B2 | 11/2016 | Lewis | |
| 9,569,459 B1* | 2/2017 | Strauss | G06F 16/182 |
| 9,602,424 B1* | 3/2017 | Vincent | H04L 67/1008 |
| 9,952,971 B2 | 4/2018 | Krishnaprasad et al. | |
| 10,095,888 B1* | 10/2018 | Lee | G06F 21/64 |
| 10,477,994 B2 | 11/2019 | Johnson | |
| 11,068,330 B2* | 7/2021 | Ota | G06F 11/1004 |
| 11,093,139 B1* | 8/2021 | Karr | G06F 3/0685 |
| 11,514,528 B1* | 11/2022 | Ciliberti | G06N 20/00 |
| 2008/0162990 A1* | 7/2008 | Wang | G06F 11/1407 714/19 |
| 2009/0328186 A1* | 12/2009 | Pollutro | G06F 21/335 726/13 |
| 2013/0231824 A1 | 9/2013 | Wilson et al. | |
| 2014/0080522 A1 | 3/2014 | Johnson | |
| 2014/0289234 A1 | 9/2014 | Johnson | |
| 2014/0365281 A1 | 12/2014 | Onischuk | |
| 2015/0012339 A1 | 1/2015 | Onischuk | |
| 2015/0116765 A1* | 4/2015 | Kubota | H04N 1/00946 358/1.15 |
| 2015/0199405 A1 | 7/2015 | Redlich et al. | |
| 2015/0277969 A1* | 10/2015 | Strauss | G06F 9/466 707/703 |
| 2015/0363697 A1 | 12/2015 | Spivack | |
| 2016/0195856 A1 | 7/2016 | Spero | |
| 2016/0283197 A1 | 9/2016 | Wilber | |
| 2017/0060356 A1* | 3/2017 | Oota | G06F 3/0482 |
| 2017/0075877 A1 | 3/2017 | Lepeltier | |
| 2017/0140259 A1 | 5/2017 | Bergstra | |
| 2017/0317495 A1 | 11/2017 | Pavlovski et al. | |
| 2018/0018358 A1 | 1/2018 | Birdwell et al. | |
| 2018/0136633 A1 | 5/2018 | Small et al. | |
| 2018/0225194 A1* | 8/2018 | Saleh-Esa | G06Q 10/06311 |
| 2018/0262005 A1 | 9/2018 | Lazaris | |
| 2018/0310174 A1* | 10/2018 | Rougier | H04W 12/04 |
| 2019/0036932 A1* | 1/2019 | Bathen | H04L 9/30 |
| 2019/0324727 A1* | 10/2019 | Carranza | G06F 11/3604 |
| 2020/0211692 A1* | 7/2020 | Kalafut | G06N 20/00 |
| 2020/0334567 A1* | 10/2020 | Bhattacharjee | H04L 67/125 |
| 2020/0364586 A1* | 11/2020 | Sampaio | G06N 5/003 |
| 2021/0035020 A1* | 2/2021 | Boulineau | G06K 9/6256 |
| 2021/0097405 A1* | 4/2021 | McNeil | G06N 5/04 |
| 2021/0117780 A1* | 4/2021 | Malik | G06F 16/9536 |
| 2021/0133562 A1* | 5/2021 | Hong | G06N 3/0454 |
| 2021/0201190 A1* | 7/2021 | Edgar | G06N 5/04 |
| 2021/0232472 A1* | 7/2021 | Nagaraj | G06N 20/20 |
| 2022/0114043 A1* | 4/2022 | Goodsitt | G06F 11/0784 |
| 2022/0286446 A1* | 9/2022 | Hecht | H04L 63/083 |

\* cited by examiner

DISTRIBUTED ARTIFICIAL INTELLIGENCE MODEL WITH DECEPTION NODES

TECHNICAL FIELD

This disclosure relates generally to securing artificial intelligence models.

BACKGROUND

Artificial intelligence applications apply models to input data to generate output predictions.

SUMMARY OF THE DISCLOSURE

Machine learning applications apply models to input data to make predictions that may have profound impacts on the world or in the lives of users. Generally, a machine learning application maps values from an input domain into an output range for a target variable. The mapping is usually not deterministic or represented using a mathematic formula. Rather, the mapping may be understood as a learned behavior from the input data which models the output target variable. These mappings are also understood as predictions. A primary task in developing a machine learning application is creating and training the model. Training data is used to train and tune the model.

After a model has been created, securing the model becomes a concern. Typically, the models are stored on servers and called when needed. However, if a malicious user were to gain access to the servers and reverse engineer the model, the malicious user would understand how the machine learning application makes its predictions. The malicious user would then be able to trick the machine learning application into making improper predictions or to perform improper functions. Thus, securing the model is important to the proper functioning of the machine learning application.

This disclosure contemplates a model designer that improves the security of a machine learning model in certain embodiments. Instead of storing the model in a central location, the training data used to build and train the model is stored across several different databases and/or datacenters. The training data is divided into portions and stored as a circular linked list across these databases and/or datacenters. The model designer retrieves the training data and incrementally builds and trains the model using the training data. The incremental error and bias of the model is used to locate training data between datacenters. Additionally, fake training data is appended to the circular linked list and the model designer tracks how much training data is used before hitting fake training data. In this manner, a malicious user would need to access multiple datacenters to access all the training data. Moreover, the malicious user would not know when fake training data has been accessed, which prevents the malicious user from developing a proper model. Certain embodiments are described below.

According to an embodiment, an apparatus includes a memory and a hardware processor communicatively coupled to the memory. The processor receives a request to access an artificial intelligence model and retrieves, in response to the request and from a first datacenter, a first data node comprising first data for the artificial intelligence model and a first pointer to a second data node stored in the first datacenter. The processor then builds the artificial intelligence model using the first data and retrieves, from the first datacenter and according to the first pointer, the second data node comprising second data for the artificial intelligence model and a second pointer to a third data node for the artificial intelligence model stored in a second datacenter. The processor also builds the artificial intelligence model using the second data, calculates an error of the artificial intelligence model after the artificial intelligence model has been built using the first and second data, and uses the error and the second pointer to determine an address of the third data node in the second datacenter. The processor then retrieves, from the second datacenter at the address, the third data node comprising third data for the artificial intelligence model and builds the artificial intelligence model using the third data.

According to an embodiment, an apparatus includes a memory and a hardware processor communicatively coupled to the memory. The processor receives a request to access the artificial intelligence model and retrieves, in response to the request and from a first datacenter, a first data node comprising first data for the artificial intelligence model and a first pointer to a second data node stored in a second datacenter. The processor also builds the artificial intelligence model using the first data and retrieves, from the second datacenter and according to the first pointer, the second data node comprising second data for the artificial intelligence model and a second pointer to a third data node stored in the second datacenter. The processor then builds the artificial intelligence model using the second data, determines that a number of data nodes equal to the limit have been used to build the artificial intelligence model, and in response to determining that the number of data nodes is equal to the required number, terminates building the artificial intelligence model without retrieving the third data node from the second datacenter.

Certain embodiments provide one or more technical advantages. For example, an embodiment improves the security of a machine learning model by storing the training data for the model across several datacenters. As another example, an embodiment improves the security of a machine learning model by adding fake training data in with real training data. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
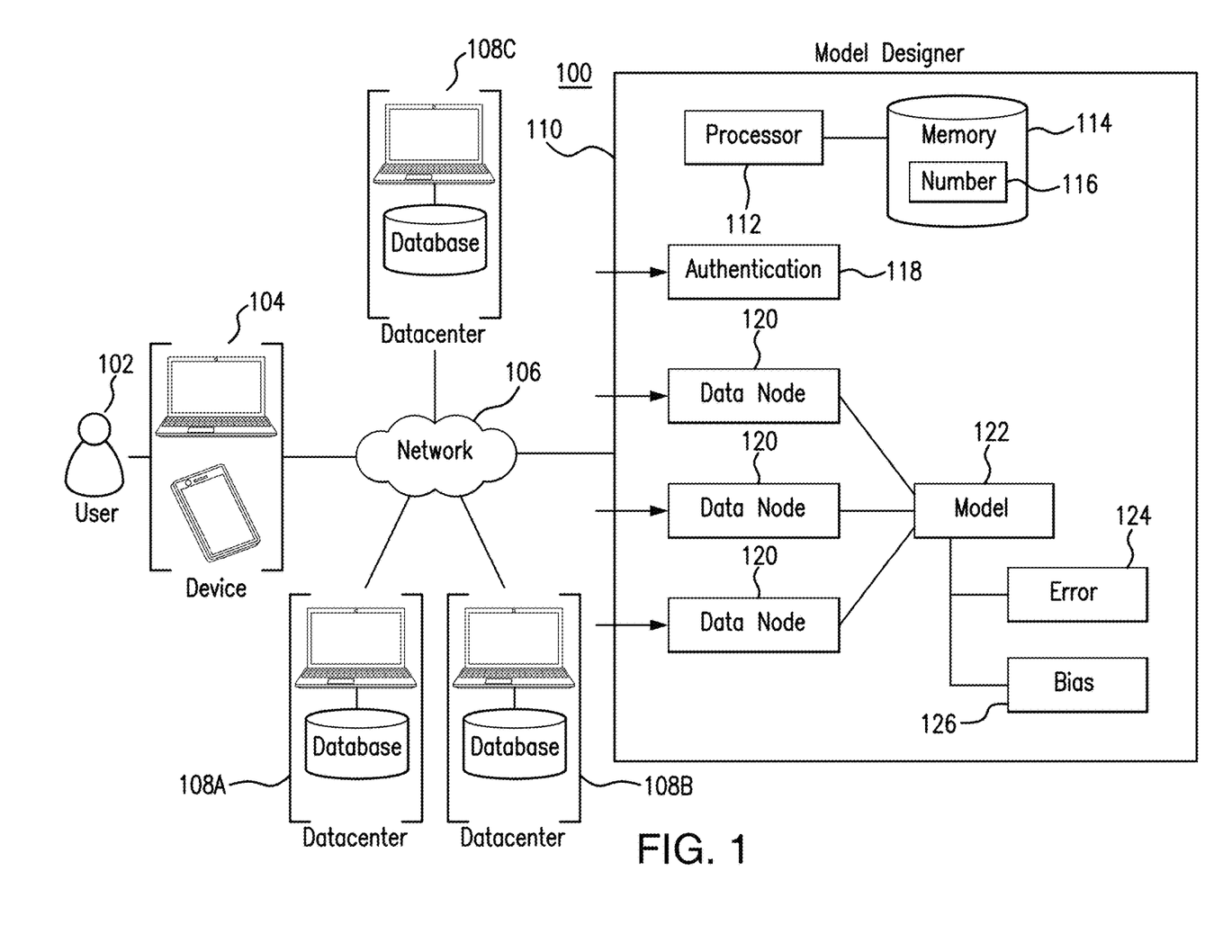
FIG. 1 illustrates an example system.
Figure 2A:
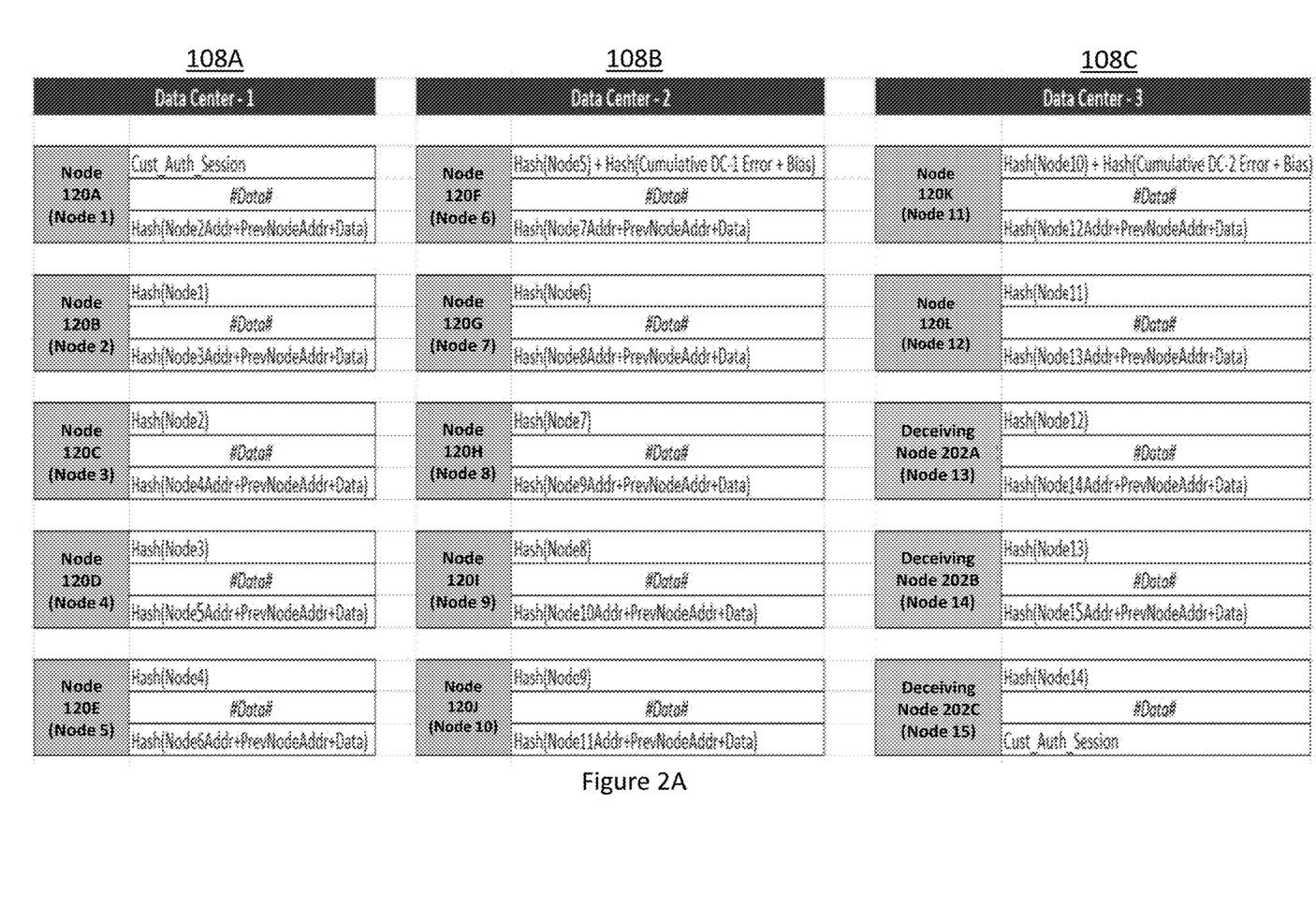
FIG. 2A illustrates example data nodes in the system of FIG. 1.
Figure 2B:
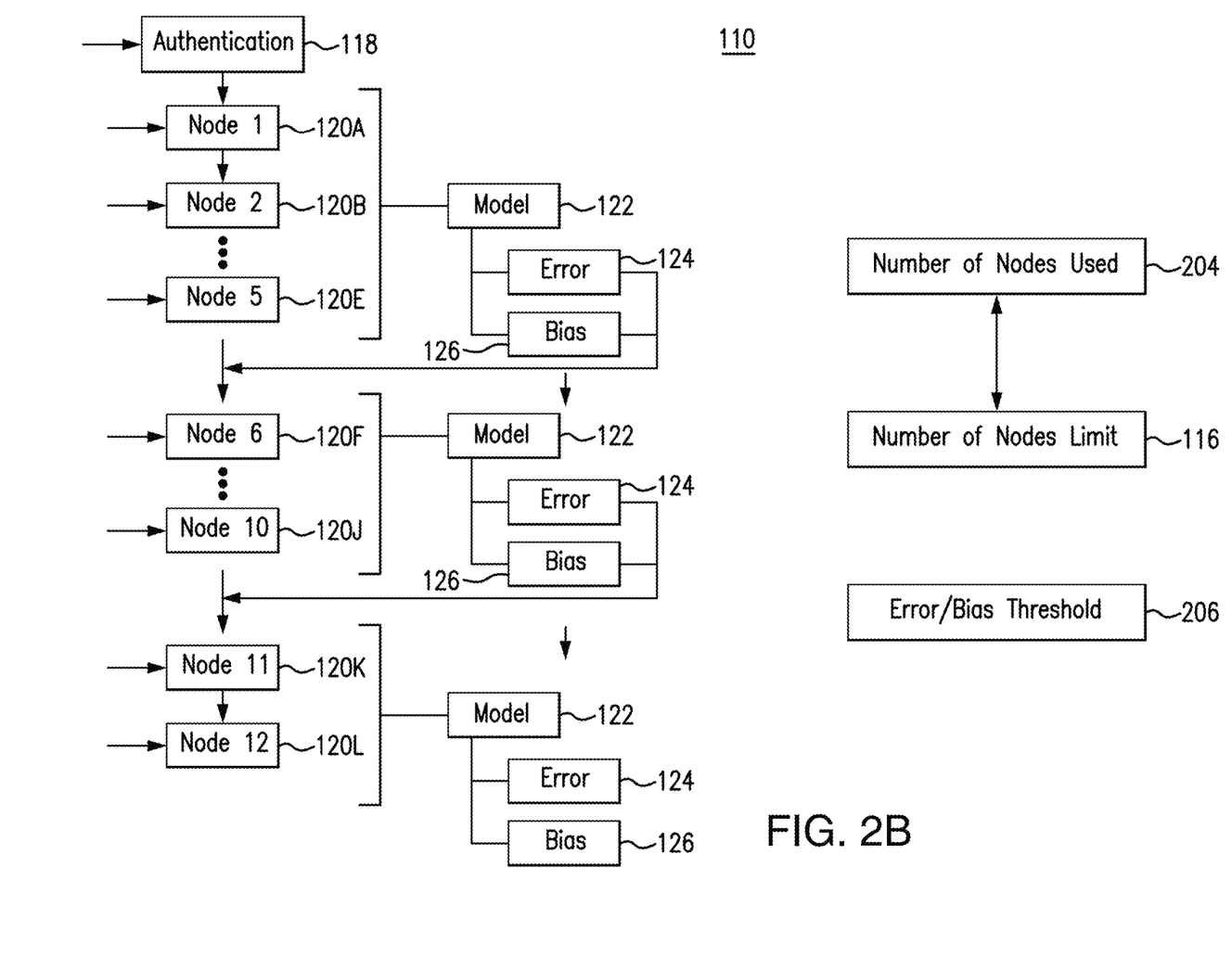
FIG. 2B illustrates an example model designer of the system of FIG. 1.
Figure 3:
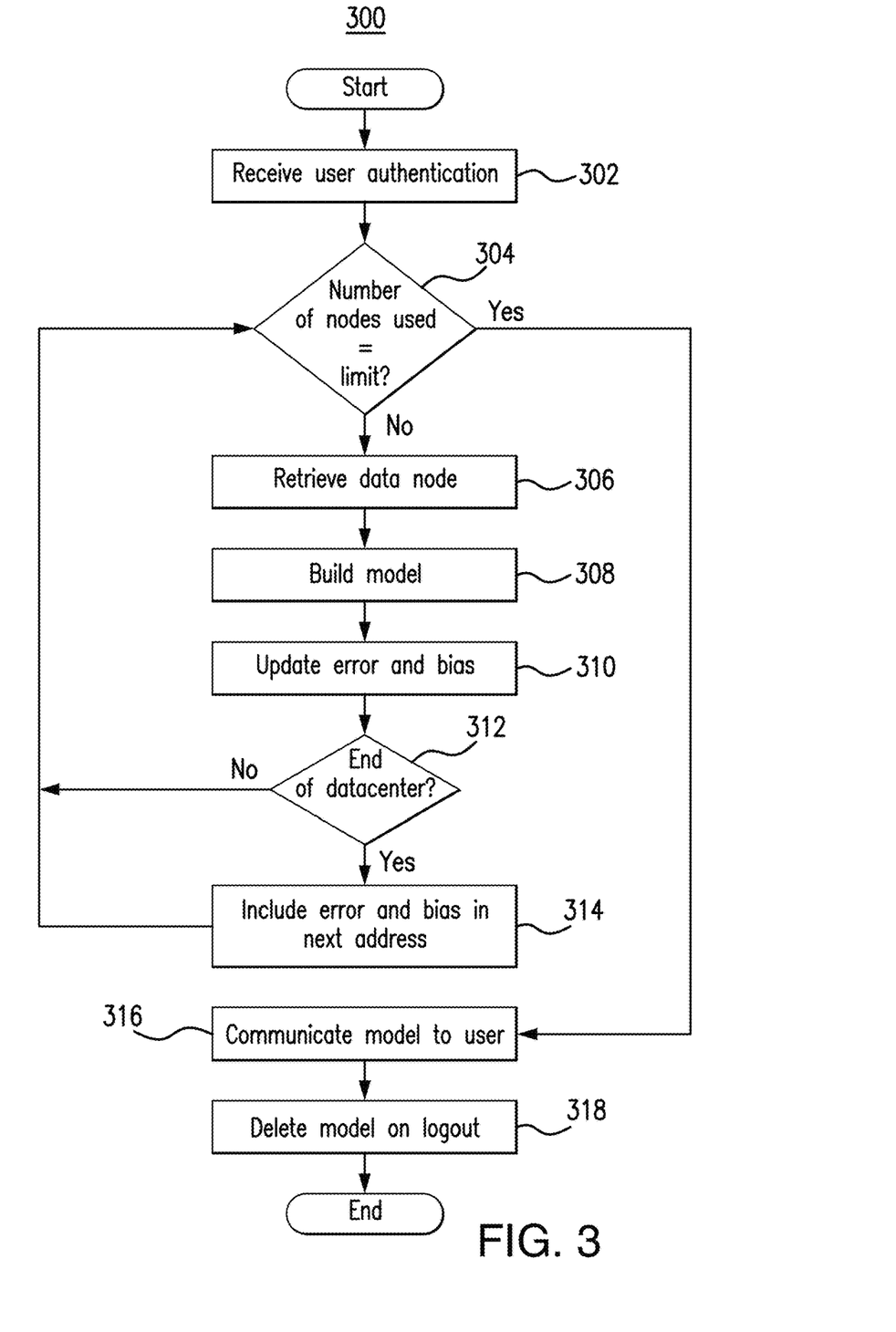
FIG. 3 is a flowchart illustrating a method of securing a machine learning model using the system of FIG. 1.

Embodiments of the present disclosure and its advantages are best understood by referring to FIGS. 1 through 3 of the drawings, like numerals being used for like and corresponding parts of the various drawings.

Machine learning applications apply models to input data to make predictions that may have profound impacts on the world or in the lives of users. Generally, a machine learning application maps values from an input domain into an output range for a target variable. The mapping is usually not deterministic or represented using a mathematic formula. Rather, the mapping may be understood as a learned behavior from the input data which models the output target variable. These mappings are also understood as predictions. A primary task in developing a machine learning application is creating and training the model. Training data is used to train and tune the model.

After a model has been created, securing the model becomes a concern. Typically, the models are stored on servers and called when needed. However, if a malicious user were to gain access to the servers and reverse engineer the model, the malicious user would understand how the machine learning application makes its predictions. The malicious user would then be able to trick the machine learning application into making improper predictions or to perform improper functions. Thus, securing the model is important to the proper functioning of the machine learning application.

This disclosure contemplates a model designer that improves the security of a machine learning model in certain embodiments. Instead of storing the model in a central location, the training data used to build and train the model is stored across several different databases and/or datacenters. The training data is divided into portions and stored as a circular linked list across these databases and/or datacenters. The model designer retrieves the training data and incrementally builds and trains the model using the training data. The incremental error and bias of the model is used to locate training data between datacenters. Additionally, fake training data is appended to the circular linked list and the model designer tracks how much training data is used before hitting fake training data. In this manner, a malicious user would need to access multiple datacenters to access all the training data. Moreover, the malicious user would not know when fake training data has been accessed, which prevents the malicious user from developing a proper model.

A practical application of the model designer is that the model designer improves the security of a machine learning model by storing the training data for the model as a circular linked list across multiple datacenters and/or by adding fake training data into the circular linked list. This design makes it more difficult for a malicious user to access all the training data and to know which training data to use to build a model. The system will be described in more detail using FIGS. 1 through 3.

FIG. 1 illustrates an example system 100. As seen in FIG. 1, system 100 includes one or more devices 104, a network 106, one or more datacenters 108, and a model designer 110. Generally, model designer 110 uses training data stored across the one or more datacenters 108 to build and/or train a machine learning model. The storage, access, and usage of the training data is designed to improve the security of the training data and the machine learning model in particular embodiments.

Users 102 use one or more devices 104 to communicate and interact with other components of system 100. For example, the user 102 may use a device 104 to communicate training data to one or more datacenters 108. As another example, a user 102 may use a device 104 to issue instructions to model designer 110, such as, for example, logging in to model designer 110 and/or instructing model designer 110 to build a machine learning model. As yet another example, a user 102 may use a device 104 to instruct model designer 110 to apply a model to make output predictions.

Devices 104 include any appropriate device for communicating with components of system 100 over network 106. For example, devices 104 may be a telephone, a mobile phone, a computer, a laptop, a tablet, an automated assistant, and/or a cash register. This disclosure contemplates device 104 being any appropriate device for sending and receiving communications over network 106. As an example and not by way of limitation, device 104 may be a computer, a laptop, a wireless or cellular telephone, an electronic notebook, a personal digital assistant, a tablet, or any other device capable of receiving, processing, storing, and/or communicating information with other components of system 100. Device 104 may also include a user interface, such as a display, a microphone, keypad, or other appropriate terminal equipment usable by user 102. Device 104 may include a hardware processor, memory, and/or circuitry configured to perform any of the functions or actions of device 104 described herein. For example, a software application designed using software code may be stored in the memory and executed by the processor to perform the functions of device 104.

Network 106 allows communication between and amongst the various components of system 100. For example, user 102 may use devices 104 to communicate over network 106. This disclosure contemplates network 106 being any suitable network operable to facilitate communication between the components of system 100. Network 106 may include any interconnecting system capable of transmitting audio, video, signals, data, messages, or any combination of the preceding. Network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Datacenters 108 store and communicate data to other components of system 100. System 100 may include any suitable number of datacenters 108. In certain embodiments, datacenters 108 may be distinct and separate datacenters 108 from each other. In certain embodiments, datacenters 108 may be contained in the same physical space but be delineated by separate servers and/or databases. Each datacenter 108 may include servers and/or databases that are configured to store data for other components of system 100. For example, each datacenter 108 may store training data that can be used to build a machine learning model. In particular embodiments, the training data is stored and accessed in a particular manner that improves the security of the training data and the resulting machine learning model. Generally, the training data is stored as a circular linked list across multiple datacenters 108. For example, the training data may be stored as a circular linked list across datacenters 108A, 108B and 108C. Datacenter 108A may store a first portion of the training data and a pointer to an address in datacenter 108B. Datacenter 108B may store a second portion of the training data at the address indicated by the pointer in datacenter 108A. Datacenter 108B may also store a pointer to an address in datacenter 108C. Datacenter 108C may store a third portion of the training data at the address indicated by the pointer in datacenter 108B. The training data may be accessed sequentially from datacenter 108 to datacenter 108. The pointers from one datacenter 108 to another datacenter 108 may include certain characteristics of a machine learning model, such as for example, an error or bias that is cumulatively updated as the machine learning model is built with the training data that is sequentially accessed. In this manner, training data in subsequent datacenters 108 may not be accessed unless the training data in a current datacenter 108 is being properly used to build the machine learning model. In this manner, a malicious user may not be able to gain access to all the training data. In some embodiments, fake training data may be added to the circular linked list. A component that accesses the training data may know how to determine whether training data that is being accessed is fake training data or real training data. The fake training data is not used in building a machine learning model. In this manner, a malicious user who accesses the training data may end up using the fake training data and build an improper machine learning model.

Model designer 110 builds and trains machine learning models using training data from datacenters 108. In particular embodiments, the manner in which training data is accessed and/or used by model designer 110 improves the security of the training data and the resulting machine learning model. Model designer 110 includes a processor 112 and a memory 114. This disclosure contemplates processor 112 and memory 114 being configured to perform any of the functions or actions that model designer 110 described herein.

Processor 112 is any electronic circuitry, including, but not limited to microprocessors, application specific integrated circuits (ASIC), application specific instruction set processor (ASIP), and/or state machines, that communicatively couples to memory 114 and controls the operation of model designer 110. Processor 112 may be 8-bit, 16-bit, 32-bit, 64-bit or of any other suitable architecture. Processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 112 may include other hardware that operates software to control and process information. Processor 112 executes software stored on memory to perform any of the functions described herein. Processor 112 controls the operation and administration of model designer 110 by processing information received from devices 104, network 106, and memory 114. Processor 112 may be a programmable logic device, a microcontroller, a microprocessor, any suitable processing device, or any suitable combination of the preceding. Processor 112 is not limited to a single processing device and may encompass multiple processing devices.

Memory 114 may store, either permanently or temporarily, data, operational software, or other information for processor 112. Memory 114 may include any one or a combination of volatile or non-volatile local or remote devices suitable for storing information. For example, memory 114 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 114, a disk, a CD, or a flash drive. In particular embodiments, the software may include an application executable by processor 112 to perform one or more of the functions described herein.

Model designer 110 stores a number 116 that may be used to determine when fake training data has been reached in building a machine learning model. For example, number 116 may be a limit on the number of data nodes containing training data that have been accessed and/or used to build a machine learning model. When the amount of training data used reaches the limit, then the model designer 110 stops building the machine learning model even if there are additional data nodes in the circular linked list. As another example, the number 116 may be a threshold on the error or bias of the machine learning model. When a machine learning model being built by model designer 110 reaches that error or bias threshold, model designer 110 may stop accessing training data to build the machine learning model even if there is additional training data available in the circular list. By keeping number 116 with model designer 110, it may be more difficult for a malicious user to build a proper machine learning model, even if the malicious user were to gain access to all of the training data stored across the multiple datacenters 108, in particular embodiments.

Model designer 110 receives an authentication 118 from user 102 or device 104. Authentication 118 may be a token that indicates the credentials of user 102 and/or device 104. Model designer 110 may generate a session for user 102 and device 104 in response to receiving authentication 118. Authentication 118 may include or indicate a request to build a machine learning model using certain training data. In response to receiving authentication 118, model designer 110 may begin retrieving training data from multiple datacenters 108 and building a machine learning model. This disclosure contemplates authentication 118 including any suitable information, such as, for example, a username, a password, a personal identification number, biometric information, an indication of a machine learning model to be built, an indication of training data to be used, and/or an indication of one or more datacenters 108 where the training data is stored. In certain embodiments, authentication 118 may serve as the address of a first portion of training data stored in a first datacenter 108. Model designer 110 may use authentication 118 to access that first portion of training data.

Model designer 110 may sequentially retrieve data nodes 120 from datacenters 108. As discussed previously, the first data node 120 may be retrieved at an address indicated by authentication 118. Model designer 110 may access the address in a particular datacenter 108 to retrieve the first data node 120. Model designer 110 may then build or train a machine learning model 122 using the data node 120. The data node 120 may include the training data and a pointer to the next data node 120 in the circular link list. Model designer 110 may follow that pointer to retrieve the next data node 120. The next data node 120 may then be used to further build and/or train the machine learning model 122. Model designer 110 continues retrieving data nodes 120 by following the pointers in each data node 120 until the machine learning model 122 that is being built or trained is complete. As discussed previously, in some embodiments, model designer 110 may user number 116 to determine when the machine learning model 122 is complete.

Model designer 110 may cumulatively update certain characteristics of model 122. As model 122 is being built or trained, in the example of FIG. 1, model designer 110 tracks an error 124 and a bias 126 of model 122. For example, as each data node 120 is retrieved and used to build or train model 122, the error 124 and bias 126 of model 122 is updated.

In certain embodiments, the error 124 and/or bias 126 are used to transition between datacenters 108. For example, the last data node 120 in a datacenter 108 may include a pointer to an address in another datacenter 108. That pointer is combined with the error 124 and/or bias 126 to form a pointer to the actual address in the other datacenter 108 where the next data node 120 in the circular link list is stored. In this manner, it becomes more difficult for a malicious user to access all of the training data used to build a machine learning model 122, because the malicious user will not be able to locate the training data in other datacenters 108 unless the malicious user is building the machine learning model 122 properly.

FIG. 2A illustrates example data nodes 120 in the system 100 of FIG. 1. In the example of FIG. 2A data nodes 120 are stored in datacenters 108A, 108B, and 108C. The data nodes 120 are stored as a circular linked list across datacenters 108A, 108B, and 108C. In particular embodiments, the manner in which data nodes 120 are stored across multiple datacenters 108 improves the security of data nodes 120 and/or the resulting machine learning model 122 built from the data nodes 120.

In the example, FIG. 2A datacenter 108A stores data nodes 120A, 120B, 120C, 120D, and 120E. Datacenter 108B stores data nodes 120F, 120G, 120H, 120I, and 120J. Datacenter 108C stores data nodes 120K and 120L. Each data node 120 includes three pieces of information. First, each data node 120 includes an address of that data node 120 in its datacenter 108. Second, each data node 120 includes training data that is used to build a machine learning model. Third, each data node 120 includes a pointer to the next data node 120 in the circular linked list. These three pieces of information are arranged top-to-bottom for each data node 120 in FIG. 2A.

Node 120A is the first data node 120 in the circular linked list. Node 120A is stored in datacenter 108A. As seen in FIG. 2A, the address of data node 120A is indicated by an authentication 118 and/or a session provided through authentication 118. As discussed previously authentication 118 provided by user 102 may include an address for the first portion of training data for building a machine learning model 122. That address may be used by model designer 110 to retrieve data node 120A from datacenter 108A. Also, as seen in FIG. 2A, data node 120A includes training data that model designer 110 uses to build and/or train a model 122. Lastly, node 120A includes a pointer to data node 120B in datacenter 108A. The pointer may be a hash of an address in datacenter 108A, the address for data node 120A, and the training data in data node 120A. By following this pointer, model designer 110 may retrieve data node 120B from datacenter 108A.

Data node 120B is structured similarly to data node 120A. Data node 120B includes an address for data node 120B, the training data that can be used to build or a train machine learning model 122, and a pointer to data node 120C. Model designer 110 may use training data from data node 120B to train the machine learning model 122 after model designer 110 has trained the machine learning model 122 using the training data from data node 120A. After model designer 110 has completed using the training data from data node 120B, model designer 110 may continue in the linked list to data node 120C. This process continues until model designer 110 reaches data node 120E, which is the last data node 120 stored in datacenter 108A.

As seen in FIG. 2A, data node 120E includes a pointer to data node 120F in datacenter 108B. When model designer 110 determines that data node 120E includes an address to a separate datacenter 108, model designer 110 may know that an additional check needs to be performed to transition to the next datacenter 108. For example, model designer 110 may track the cumulative error 124 or bias 126 of the machine learning model 122 as model designer 110 builds or trains the machine learning model 122 using the training data from data nodes 120A, 120B, 120C, 120D, and 120E. Model designer 110 may use this cumulative error 124 or bias 126 in locating a data node 120 in a separate datacenter 108. In the example of FIG. 2A, data node 120E includes a pointer to an address in datacenter 108B. Model designer 110 adds to this pointer a hash of the cumulative error 124 and bias 126 to form an address for data node 120F in datacenter 108B. In other words, model designer 110 accesses data node 120F in datacenter 108B by offsetting the pointer in data node 120E with the cumulative error 124 and bias 126 of the machine learning model 122. In a similar manner, model designer 110 accesses data node 120K in datacenter 108C by offsetting the pointer from data node 120J with the cumulative error 124 and bias 126 of the machine learning model 122. By introducing this offset when transitioning between datacenters 108, model designer 110 makes it more difficult for a malicious user to access all of the training data for a machine learning model 122. Because the training data in other datacenters 108 can be accessed only if the machine learning model 122 is built properly using the previous data nodes 120 sequentially to reflect a proper error 124 and bias 126, it may make it more difficult for a malicious user to access data nodes in other datacenters 108.

Model designer 110 builds the machine learning model 122 iteratively as model designer 110 retrieves data nodes 120 from datacenters 108A, 108B, and 108C. As the training data in each data node 120 is used to build and/or train the model 122, the cumulative error 124 and bias 126 is tracked to access data nodes 120 in other datacenters 108. Model designer 110 continues retrieving data nodes 120 according to the linked list structure provided in each data node 120 until model designer 110 determines that the training data has all been used to build or train the machine learning model 122.

In certain embodiments, fake training data is appended to the circular linked list to further improve the security of the training data and machine learning model 122. In the example of FIG. 2A, fake training data in the form of deceiving nodes 202 is appended to the linked list. As seen in FIG. 2A, datacenter 108C stores deceiving nodes 202A, 202B, and 202C. The pointer in data node 120L points to deceiving node 202A. The pointer in deceiving node 202A points to deceiving node 202B. The pointer in deceiving node 202B points to deceiving node 202C. Lastly, the pointer in deceiving node 202C points to data node 120A, thus, completing the circular linked list. As seen in FIG. 2A, the structure of deceiving nodes 202 may be similar to the structure of data nodes 120. As a result, a malicious user may not be able to tell the difference between deceiving nodes 202 and data nodes 120. If the malicious user does not know when to stop processing data nodes 120, the malicious user may build or train the machine learning model 122 with the fake training data in deceiving nodes 202. As a result, the model 122 will produce improper results.

Model designer 110 may know when model designer 110 has reached deceiving nodes 202. For example, model designer 110 may store a limit 116 on the number of data nodes 120 to be processed to build the machine learning model 122. As model designer 110 retrieves data nodes 120 from datacenters 108, model designer 110 may increment a count of the number of data nodes 120 that have been processed. When that number reaches the limit 116, model designer 110 may stop retrieving data nodes 120. In the example of FIG. 2A, that limit may be twelve nodes to stop model designer 110 from retrieving deceiving nodes 202. As another example, model designer 110 may track the cumulative error 124 and bias 126 of the model 122. Model designer 110 may store a threshold error and/or bias. When the cumulative error 124 or bias 126 reaches the threshold, model designer 110 may stop retrieving data nodes 120 from datacenters 108.

FIG. 2B illustrates an example model designer 110 of the system 100 of FIG. 1. In the example of FIG. 2B, model designer 110 builds a model 122 using the data nodes 120 shown in the example of FIG. 2A. In particular embodiments, by building model 122 in the manner shown in FIG. 2B, the security of the training data and model 122 is improved in certain embodiments.

Model designer 110 receives authentication 118 from a user 102. User 102 may provide authentication 118 by logging into a system that includes model designer 110. Authentication 118 may indicate a request to build model 122 using data nodes 120. Authentication 118 may include an address of a first data node to be used to build model 122. In some embodiments, model designer 110 may provide a session in response to authentication 118 and the session includes an address of the first data node 120 to be used to build model 122.

Model designer 110 retrieves data node 120A from datacenter 108A based on authentication 118. Data node 120A may include training data that model designer 110 then uses to build or train machine learning model 122. Data node 120A also includes a pointer that identifies data node 120B. After model design 110 has used the training data in data node 120A to build or train model 122, model designer 110 uses the pointer to retrieve data node 120B from datacenter 108. Model designer 110 then uses the training data in data node 120B to build or train model 122. This process continues until model designer 110 finishes using the training data in data node 120E to build or train model 122.

As model designer 110 builds or trains model 122, model designer 110 updates a cumulative error 124 and/or bias 126 of model 122. When model designer 110 determines that data node 120E includes a pointer to an address in datacenter 108B, model designer 110 may add a cumulative error 124 and/or bias 126 to this address to access data node 120F in datacenter 108B. In this manner, it becomes more difficult to access training data stored in separate datacenters 108 unless model 122 is built or trained properly using previous training data. As a result, even if a malicious user were to access data nodes 120A through 120E, the malicious user may not be able to access the remaining training data without building model 122 properly.

Model designer 110 retrieves and uses data nodes 120F through 120J in a manner similar to how model designer 110 retrieved and used data nodes 120A through 120E. As model designer 110 builds or trains model 122 using the training data in data nodes 120F through 120J, the cumulative error 124 and bias 126 are updated. This cumulative error 124 and/or bias 126 are used to determine an address of data node 120K in datacenter 108C. Model designer 110 then retrieves and uses data nodes 120K and 120L in a manner similar to how data nodes 120A through 120E were retrieved and used. Model designer 110 builds or trains model 122 using the training data from data nodes 120K and 120L. The cumulative error 124 and bias 126 are updated accordingly.

Model designer 110 may track certain characteristics of data nodes 120 and/or model 122 to determine when the appropriate number of data nodes 120 had been used to build model 122. In other words, model designer 110 may avoid retrieving and using the fake training data from deceiving nodes 202. In certain embodiments, model designer 110 may track the number of data nodes 120 used 204 to build model 122. This number 204 is incremented each time model designer 110 retrieves and uses a data node 120 from a datacenter 108. Model designer 110 may track a limit 116 on the number of data nodes 120 to be used to build model 122. Model designer 110 may compare the number of data nodes used 204 with the limit 116 each time model designer 110 uses training data from a data node 120 to build or train model 122. When the number 204 reaches the limit 116, model designer 110 may determine that model 122 is complete. In the example of FIGS. 2A and 2B, limit 116 may be twelve to avoid reaching deceiving nodes 202.

In some embodiments, model designer 110 may track an error or bias threshold 206. Model designer 110 may compare the cumulative error 124 and/or bias 126 to threshold 206 to determine when model 122 is complete. When error 124 and/or bias 126 reach threshold 206, model designer 110 may determine that model 122 is complete and that no further data nodes 120 should be retrieved from datacenters 108. In this manner, model designer 110 may avoid retrieving and using deceiving nodes 202 from datacenters 108.

After model 122 is complete, model designer 110 may begin using or applying model 122 in a machine learning application to make output predictions. User 102 may communicate input data to the machine learning application. The machine learning application may then apply model 122 to make output predictions for user 102. When the user 102 has finished using the machine learning application, user 102 may log out or terminate the session with model designer 110. When user 102 logs out or terminates the session, model designer 110 may delete model 122 in certain embodiments. In this manner, model 122 is rebuilt each time a user 102 requests to use the machine learning application. In this manner, the security of the training data and model 122 is preserved because a malicious user would need to pass through each security measure discussed above to access model 122.

FIG. 3 is a flow chart illustrating method 300 of securing machine learning model 122 using the system 100 of FIG. 1. Generally, model designer 110 performs the steps of method 300 in particular embodiments. By performing method 300, the security of training data and/or machine learning model 122 is improved.

In step 302, model designer 110 receives user authentication 118. User authentication 118 may indicate a request to use a model 122 of a machine learning application. In response to receiving user authentication 118, model designer 110 may begin retrieving training data and building model 122.

In step 304, model designer 110 determines whether a number of data nodes used 204 has reached a limit 116. If the number of nodes used 204 has not reached the limit 116, model designer 110 may retrieve more data nodes 120 and continue building model 122. In step 306, model designer 110 retrieves a data node 120. Model designer 110 then builds model 122 using the training data and the retrieved data node 120 in step 308. In step 310, model designer 110 updates an error 124 and bias 126 of the model 122.

Model designer 110 then determines whether model designer 110 has reached the end of a datacenter 108. In certain embodiments, model designer 110 determines that model designer 110 has reached the end of a datacenter 108 because the last retrieved data node 120 includes a pointer to a location in another datacenter 108. If model designer 110 determines that model designer 110 has not reached the end of the datacenter 108, model designer 110 may return to step 304 and potentially retrieve additional data nodes 120 from the datacenter 108. If model designer 110 determines that model designer 110 has reached the end of a datacenter 108, model designer 110 may include the error 124 and bias 126 into the address of the next data node 120 in step 314. Model designer 110 then returns to step 304 to evaluate whether to retrieve the next data node 120 from the next datacenter 108.

If model designer 110 determines that the number of data nodes used 204 has reached the limit 116, model designer 110 may proceed to step 316 to communicate model 122 to a user 102. The user 102 may then use the model 122 in a machine learning application to make output predictions based on input data. In step 318, model designer 110 deletes model 122 when user 102 logs out. By logging out, user 102 indicates that user 102 has completed using the machine learning application and/or model 122. By deleting model 122, model designer 110 improves the security of the training data and model 122, in particular embodiments.

Modifications, additions, or omissions may be made to method 300 depicted in FIG. 3. Method 300 may include more, fewer, or other steps. For example, steps may be performed in parallel or in any suitable order. While discussed as model designer 110 performing the steps, any suitable component of system 100, such as device(s) 104 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
  a memory configured to store a limit on a number of data nodes to be used to build an artificial intelligence model; and
  a hardware processor communicatively coupled to the memory, the hardware processor configured to:
    receive a request to access the artificial intelligence model;
    retrieve, in response to the request and from a first datacenter, a first data node comprising first data for building the artificial intelligence model, a first address of the first data node in the first datacenter, and a first pointer to a second data node stored in a second datacenter;
    build the artificial intelligence model using the first data retrieved from the first datacenter;
    calculate an error of the artificial intelligence model after the artificial intelligence model has been built using the first data retrieved from the first datacenter;
    use the error and the first pointer to determine a second address of the second data node in the second datacenter;
    retrieve, from the second datacenter and according to the first pointer, the second data node comprising second data for building the artificial intelligence model, the second address of the second data node, and a second pointer to a third data node stored in the second datacenter;
    build the artificial intelligence model using the second data retrieved from the second datacenter;
    determine whether a total number of retrieved data nodes used to build the artificial intelligence model increases to a limit; and
    in response to determining that the total number of the retrieved data nodes used to build the artificial intelligence model increases to the limit, terminate building the artificial intelligence model without retrieving the third data node from the second datacenter.

2. The apparatus of claim 1, wherein the hardware processor is further configured to:
  receive a user authentication; and
  determine, based on the user authentication, the first address for the first data node in the first datacenter.

3. The apparatus of claim 1, wherein the first pointer to the second data node is formed by hashing the first address for the first data node in the first datacenter and the first data.

4. The apparatus of claim 1, wherein the hardware processor is further configured to calculate a bias for the artificial intelligence model after the artificial intelligence model has been built using the first data, wherein determining the second address of the second data node in the second datacenter is further done using the first pointer, the error, and the bias.

5. The apparatus of claim 1, wherein the artificial intelligence model is deleted when a user who initiated the request logs out.

6. The apparatus of claim 1, wherein the first datacenter is distinct from the second datacenter.

7. A method comprising:
  receiving a request to access the artificial intelligence model;
  retrieving, in response to the request and from a first datacenter, a first data node comprising first data for building the artificial intelligence model, a first address of the first data node in the first datacenter, and a first pointer to a second data node stored in a second datacenter;
  building the artificial intelligence model using the first data retrieved from the first datacenter;
  calculating an error of the artificial intelligence model after the artificial intelligence model has been built using the first data retrieved from the first datacenter;
  using the error and the first pointer to determine a second address of the second data node in the second datacenter;
  retrieving, from the second datacenter and according to the first pointer, the second data node comprising second data for building the artificial intelligence model, the second address of the second data node, and a second pointer to a third data node stored in the second datacenter;
  building the artificial intelligence model using the second data retrieved from the second datacenter;
  determining whether a total number of retrieved data nodes used to build the artificial intelligence model increases to a limit; and
  in response to determining that the total number of the retrieved data nodes used to build the artificial intelligence model increases to the limit, terminating building the artificial intelligence model without retrieving the third data node from the second datacenter.

8. The method of claim 7, further comprising:
  receiving, by the hardware processor, a user authentication; and determine, by the hardware processor and based on the user authentication, the first address for the first data node in the first datacenter.

9. The method of claim 7, wherein the first pointer to the second data node is formed by hashing the first address for the first data node in the first datacenter and the first data.

10. The method of claim 7, further comprising calculating, by the hardware processor, a bias for the artificial intelligence model after the artificial intelligence model has been built using the first data, wherein determining the second address of the second data node in the second datacenter is further done using the first pointer, the error, and the bias.

11. The method of claim 7, wherein the artificial intelligence model is deleted when a user who initiated the request logs out.

12. The method of claim 7, wherein the first datacenter is distinct from the second datacenter.

13. A system comprising:
a first datacenter;
a second datacenter; and
a model designer comprising:
   a memory configured to store a limit on a number of data nodes to be used to build an artificial intelligence model; and
   a hardware processor communicatively coupled to the memory, the hardware processor configured to:
   receive a request to access the artificial intelligence model;
   retrieve, in response to the request and from a first datacenter, a first data node comprising first data for building the artificial intelligence model, a first address of the first data node in the first datacenter, and a first pointer to a second data node stored in a second datacenter;
   build the artificial intelligence model using the first data retrieved from the first datacenter;
   calculate an error of the artificial intelligence model after the artificial intelligence model has been built using the first data retrieved from the first datacenter;
   use the error and the first pointer to determine a second address of the second data node in the second datacenter;
   retrieve, from the second datacenter and according to the first pointer, the second data node comprising second data for building the artificial intelligence model, the second address of the second data node, and a second pointer to a third data node stored in the second datacenter;
   build the artificial intelligence model using the second data retrieved from the second datacenter;
   determine whether a total number of retrieved data nodes used to build the artificial intelligence model increases to a limit; and
   in response to determining that the total number of the retrieved data nodes used to build the artificial intelligence model increases to the limit, terminate building the artificial intelligence model without retrieving the third data node from the second datacenter.

14. The system of claim 13, wherein the hardware processor is further configured to:
receive a user authentication; and
determine, based on the user authentication, the first address for the first data node in the first datacenter.

15. The system of claim 13, wherein the first pointer to the second data node is formed by hashing the first address for the first data node in the first datacenter and the first data.

16. The system of claim 13, wherein the hardware processor is further configured to calculate a bias for the artificial intelligence model after the artificial intelligence model has been built using the first data, wherein determining the second address of the second data node in the second datacenter is further done using the first pointer, the error, and the bias.

17. The system of claim 13, wherein the artificial intelligence model is deleted when a user who initiated the request logs out.

* * * * *